(12) United States Patent
Khapra et al.

(10) Patent No.: US 10,614,100 B2
(45) Date of Patent: Apr. 7, 2020

(54) SEMANTIC MERGE OF ARGUMENTS

(71) Applicant: International Business Machines Corporation, Armonk, NY (US)

(72) Inventors: Mitesh Khapra, Bangalore (IN); Vikas Raykar, Bangalore (IN); Amrita Saha, Bangalore (IN); Noam Slonim, Jerusalem (IL); Ashish Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/698,854

(22) Filed: Apr. 29, 2015

(65) Prior Publication Data

US 2015/0370887 A1 Dec. 24, 2015

Related U.S. Application Data (60) Provisional application No. 62/014,142, filed on Jun. 19, 2014.

(51) Int. Cl.
 G06F 16/28 (2019.01)
 G06N 20/00 (2019.01)
 G06F 16/901 (2019.01)
 G06N 5/02 (2006.01)

(52) U.S. Cl.
 CPC ........ G06F 16/285 (2019.01); G06F 16/9024 (2019.01); G06N 5/022 (2013.01); G06N 20/00 (2019.01)

(58) Field of Classification Search
 CPC ......... G06F 17/30598; G06F 17/30958; G06F 17/30705; G06F 17/30707; G06F 17/3071; G06F 16/285; G06F 16/9024; G06N 5/022; G06N 99/005; G06N 20/00
 USPC .............. 707/736, 737, 739, 803; 704/9, 10
 See application file for complete search history.

(56) References Cited

U.S. PATENT DOCUMENTS

| | | | |
|---|---|---|---|
| 7,865,354 B2 * | 1/2011 | Chitrapura | G06F 17/2785 704/4 |
| 8,204,751 B1 * | 6/2012 | Di Fabbrizio | G06F 17/271 704/256 |
| 2002/0032574 A1 * | 3/2002 | Lowrance | G06Q 10/06 706/14 |
| 2005/0203924 A1 * | 9/2005 | Rosenberg | G06F 17/30696 |
| 2007/0244693 A1 * | 10/2007 | Atallah | G06F 17/271 704/9 |
| 2008/0077570 A1 | 3/2008 | Tang et al. | |
| 2011/0234593 A1 * | 9/2011 | Heilmann | G06Q 10/06 345/440 |
| 2012/0117068 A1 * | 5/2012 | Onishi | G06F 16/35 707/737 |
| 2013/0124397 A1 * | 5/2013 | Fox | G06Q 10/10 705/39 |

(Continued)

*Primary Examiner* — Hares Jami
(74) *Attorney, Agent, or Firm* — Dvir Gassner (57) ABSTRACT

A method comprising using at least one hardware processor for: receiving a topic under consideration (TUC) and a set of claims referring to the TUC; identifying semantic similarity relations between claims of the set of claims; clustering the claims into a plurality of claim clusters based on the identified semantic similarity relations, wherein said claim clusters represent semantically different claims of the set of claims; and generating a list of non-redundant claims comprising said semantically different claims.

17 Claims, 3 Drawing Sheets

(56) References Cited

U.S. PATENT DOCUMENTS

| | | | |
|---|---|---|---|
| 2013/0132364 A1* | 5/2013 | Udupa | G06Q 30/0251 707/709 |
| 2013/0144605 A1* | 6/2013 | Brager | G06F 16/30 704/9 |
| 2013/0157245 A1* | 6/2013 | Basu | G09B 7/02 434/362 |
| 2013/0212098 A1 | 8/2013 | Gallivan | |
| 2013/0325440 A1 | 12/2013 | Kim et al. | |
| 2014/0279763 A1* | 9/2014 | Madnani | G06N 99/005 706/12 |
| 2015/0220833 A1* | 8/2015 | Le | G06N 3/04 706/16 |

* cited by examiner

SEMANTIC MERGE OF ARGUMENTS

CROSS-REFERENCE TO RELATED APPLICATIONS

This application claims the benefit of U.S. Provisional Patent Application No. 62/014,142, entitled "Semantic Merge of Arguments", filed Jun. 19, 2014, the contents of which are incorporated herein by reference in their entirety.

BACKGROUND

The present invention relates to the field of data analysis.

A basic task that people engage in on a daily basis is to provide claims with respect to some topic and support these claims. For example, people may require claims to persuade others, such as in the course of a debate. Persuading can either take the form of influencing someone to take your point of view, agreeing to your opinion, performing a certain task and so forth. Examples can come from various domains such as law, politics, marketing, financial and business advising, IP protection, etc. In such scenarios, people are required to provide convincing claims (and counter claims) in order to persuade the other side.

Text mining, also referred to as text analytics (or analysis), is often defined as the automated process of deriving high-quality information from text (specifically, large amounts of text) via computer processing. High-quality information is typically derived through the devising of patterns and trends through means such as statistical pattern learning and machine learning. Text mining usually involves the process of structuring the input text (usually parsing, along with the addition of some derived linguistic features and the removal of others, and subsequent insertion into a database), deriving patterns within the structured data, and finally evaluation and interpretation of the output. 'High quality' in text mining usually refers to some combination of relevance, novelty, and interestingness. Typical text mining tasks may include text categorization, text clustering, concept/entity extraction, production of granular taxonomies, sentiment analysis, document summarization, and entity relation modeling (i.e., learning relations between named entities).

Text analysis may involve information retrieval, lexical analysis to study word frequency distributions, pattern recognition, tagging/annotation, information extraction, data mining techniques including link and association analysis, visualization, and predictive analytics. The overarching goal may be, essentially, to turn text into data for analysis, via application of methods such as natural language processing (NLP) and analytical methods.

With continuous advancements and an increase in user popularity, data mining and text analysis technologies may serve as an invaluable resource across a wide range of disciplines.

The technology is now broadly applied for a wide variety of needs, including government, research and business needs. Applications of text analysis may include intelligence, security, e-discovery, records management, publishing, automated ad placement, social media monitoring, scientific discovery etc.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: receiving a topic under consideration (TUC) and a set of claims referring to the TUC; identifying semantic similarity relations between claims of the set of claims; clustering the claims into a plurality of claim clusters based on the identified semantic similarity relations, wherein said claim clusters represent semantically different claims of the set of claims; and generating a list of non-redundant claims comprising said semantically different claims.

There is provided, in accordance with another embodiment, a computer program product comprising a non-transitory computer-readable storage medium having program code embodied therewith, the program code executable by at least one hardware processor to: receive a topic under consideration (TUC) and a set of claims referring to the TUC; identify semantic similarity relations between claims of the set of claims; cluster the claims into a plurality of claim clusters based on the identified semantic similarity relations, wherein said claim clusters represent semantically different claims of the set of claims; and generate a list of non-redundant claims comprising said semantically different claims.

There is provided, in accordance with a further embodiment, a system comprising: (i) a non-transitory storage device having stored thereon instructions for: receiving a topic under consideration (TUC) and a set of claims referring to the TUC, identifying semantic similarity relations between claims of the set of claims, clustering the claims into a plurality of claim clusters based on the identified semantic similarity relations, wherein said claim clusters represent semantically different claims of the set of claims, and generating a list of non-redundant claims comprising said semantically different claims; (ii) at least one hardware processor configured to execute said instructions.

In some embodiments, the method further comprises using said at least one hardware processor for: receiving a set of arguments referring to the TUC, said set of arguments comprising said set of claims, wherein one or more of said claims are associated with supportive evidence and wherein each argument of the set of arguments comprises a claim of the set of claims and its associated evidence; clustering the arguments into a plurality of argument clusters corresponding to said claim clusters, wherein said argument clusters represent semantically different arguments of the set of arguments; and generating a list of non-redundant arguments comprising said semantically different arguments.

In some embodiments, the method further comprises using said at least one hardware processor for: identifying semantic similarity relations in each cluster of said claim clusters, between evidence associated with claims of said set of claims clustered into said each cluster, correspondingly; and clustering the evidence into a plurality of evidence clusters based on the identified semantic similarity relations between the evidence, wherein each of the evidence clusters represents semantically different evidence supporting one of said semantically different claims, wherein each argument of said semantically different arguments in said list comprises a list of non-redundant evidence supporting the claim of said each argument.

In some embodiments, said clustering of the arguments comprises: constructing a control flow graph comprising nodes and edges, wherein the nodes represent said set of arguments and the edges are weights representing the probability that said arguments are equivalent, sparsifying said control flow graph by deleting edges of said edges having weights below a predefined threshold, and applying a connected components algorithm to said control flow graph to receive said clusters of said arguments.

In some embodiments, said identifying of said semantic similarity relations between said claims comprises assigning each pair of said claims with a similarity score reflecting the level of semantic similarity between said pair of claims.

In some embodiments, said identifying of said semantic similarity relations is exercised based on machine learning techniques.

In some embodiments, said identifying of said semantic similarity relations is exercised based on a binary classifier.

In some embodiments, said binary classifier is a logistic regression classifier.

In some embodiments, said binary classifier is trained based on features selected from the group consisting of: Bilingual Evaluation Understudy (BLEU), BLEU (synonym), NIST, translation error rate, position independent error rate, part-of-speech based position-independent word error rate, TreeKernel and WordNet based similarity.

In some embodiments, said clustering of the claims comprises: constructing a control flow graph comprising nodes and edges, wherein the nodes represent said set of claims and the edges are weights representing the probability that said claims are equivalent, sparsifying said control flow graph by deleting edges of said edges having weights below a predefined threshold, and applying a connected components algorithm to said control flow graph to receive said clusters of said claims.

In some embodiments, said program code is further executable by said at least one hardware processor to: receive a set of arguments referring to the TUC, said set of arguments comprising said set of claims, wherein one or more of said claims are associated with supportive evidence and wherein each argument of the set of arguments comprises a claim of the set of claims and its associated evidence; cluster the arguments into a plurality of argument clusters corresponding to said claim clusters, wherein said argument clusters represent semantically different arguments of the set of arguments; and generate a list of non-redundant arguments comprising said semantically different arguments.

In some embodiments, said program code is further executable by said at least one hardware processor to: identify semantic similarity relations in each cluster of said claim clusters, between evidence associated with claims of said set of claims clustered into said each cluster, correspondingly; and cluster the evidence into a plurality of evidence clusters based on the identified semantic similarity relations between the evidence, wherein each of the evidence clusters represents semantically different evidence supporting one of said semantically different claims, wherein each argument of said semantically different arguments in said list comprises a list of non-redundant evidence supporting the claim of said each argument.

In some embodiments, said storage device have further stored thereon instructions for: receiving a set of arguments referring to the TUC, said set of arguments comprising said set of claims, wherein one or more of said claims are associated with supportive evidence and wherein each argument of the set of arguments comprises a claim of the set of claims and its associated evidence, clustering the arguments into a plurality of argument clusters corresponding to said claim clusters, wherein said argument clusters represent semantically different arguments of the set of arguments, and generating a list of non-redundant arguments comprising said semantically different arguments.

In some embodiments, said storage device have further stored thereon instructions for: identifying semantic similarity relations in each cluster of said claim clusters, between evidence associated with claims of said set of claims clustered into said each cluster, correspondingly; and clustering the evidence into a plurality of evidence clusters based on the identified semantic similarity relations between the evidence, wherein each of the evidence clusters represents semantically different evidence supporting one of said semantically different claims, wherein each argument of said semantically different arguments in said list comprises a list of non-redundant evidence supporting the claim of said each argument.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Automatic semantic merge of a given set of claims and/or arguments referring to a given debatable topic (i.e., a Topic Under Consideration (TUC)) is herein disclosed. The result of the semantic merge may be a smaller and non-redundant set of semantically distinct claims and/or arguments.

Given a debatable topic and an associated list of relevant arguments, where each argument includes a claim, and possibly associated supportive evidence, the disclosed semantic merge produces a potentially smaller and non-redundant list of semantically distinct arguments. This may be performed by automatically assessing the semantic similarity between each pair of claims and then exploiting the obtained pair wise similarity values to automatically partition the arguments into clusters. The received clusters of arguments may represent semantically distinct claims and arguments.

The disclosed semantic merge may be used as a stand-alone tool in order to enhance collaborative decision making applications by organizing a set of claims and/or arguments into meaningful groups. Each group may consist of similar, or even equivalent, claims and/or arguments. In addition, the disclosed semantic merge may be combined with other systems and methods, e.g., in order to support human debate on a given topic. For example, the disclosed technique may be utilized as part of the systems and techniques disclosed in U.S. patent application Ser. No. 14/265,408, filed Apr. 30, 2014, which is incorporated herein by reference in its entirety.

Furthermore, dividing a given list or set of arguments into groups such that the claims representing the arguments within each group are semantically equivalent or similar, may allow aggregating the supportive evidence associated with each claim in a group into a single pool of evidence that may provide stronger support to these claims.

For example, the initial list of arguments produced by an automatic system or techniques such as disclosed in U.S. patent application Ser. No. 14/265,408 may be highly redundant. While mining multiple massive collections of articles, for example, one should expect that the same claim will be mentioned in various forms in many different articles, or even in the same article. Alternatively, while mining semi-structured textual data that include arguments raised by various people in a given context, it is expected that different people will suggest similar claims. Thus, the initial list of claims produced by such an aforementioned automatic system or techniques is expected to include sets of similar claims, or even sets of claims that are approximately semantically equivalent, i.e., essentially conveying the same semantic idea. The disclosed semantic merge of arguments may remove, or at least reduce this redundancy in a completely automatic manner. Furthermore, the disclosed semantic merge may allow sharing of the evidence available for each claim amongst semantically similar or equivalent claims, and such that each claim is more strongly supported by the aggregated pool of evidence.

The term "claim" as referred to herein, may relate to a general, typically concise statement that directly supports or contests the debatable topic (i.e., TUC).

The term "evidence" as referred to herein with respect to a claim, may relate to text segments that directly support the claim in the context of the TUC.

The term "argument" as referred to herein, may include a claim and optionally evidence associated with the claim.

The term "equivalent claims" as referred to herein, may relate to claims which essentially convey the same idea.

The term "equivalent arguments" as referred to herein, may relate to arguments which their claims essentially convey the same idea.

Figure 1:
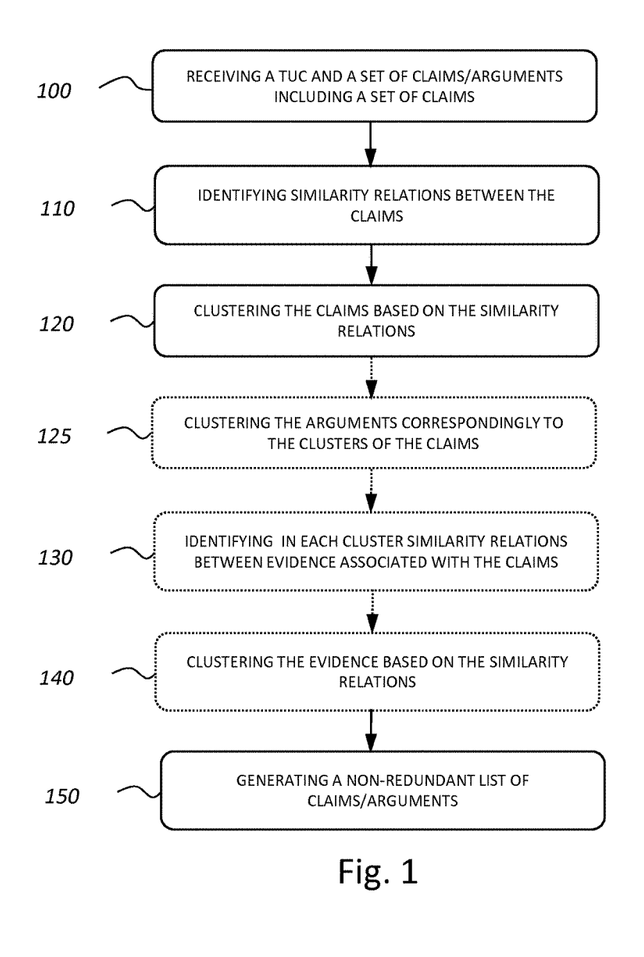
FIG. 1 shows a flowchart of a method, constructed and operative in accordance with an embodiment of the disclosed technique.

Reference is now made to FIG. 1, which shows a flowchart of a method, constructed and operative in accordance with an embodiment of the disclosed technique. The method steps disclosed herein may be carried in an order different than as listed below. In a step 100, a TUC and a set of claims referring to the TUC may be received. In some embodiments, a set of arguments which includes the set of claims may be received. Each argument may include a claim of the set of claims. Optionally, a claim may be associated with supportive evidence. In some embodiments, the argument may include more than one claim. In such a case, a representative claim may be selected (e.g., based on a quality score) to be the claim of the argument, as referred to herein below.

In a step 110, semantic similarity relations may be identified between the claims. Semantic similarity relations may be identified between each pair of claims of the set of claims.

In some embodiments, each pair of claims may be assigned with a continuous or binary similarity score. The similarity score may reflect the level of semantic similarity between two claims. The determination of the level of semantic similarity may be based on the content of the two claims, and/or the context in which they were mentioned, for example, the title of the section and/or of the article in which each claim was detected, and/or the content of their associated evidence, and so forth. Relatively high scores may imply high semantic similarity, or even semantic equivalence.

Identification of semantic similarity relations may be exercised based on various techniques stemming from fields like machine learning, natural language processing, text analytics, automatic paraphrase detection, and so forth. In particular, supervised learning techniques like logistic regression, support vector machines, Naïve Bayes classifier, and so forth, may be used for this purpose. It may further exploit various resources available in such domains like WordNet, Wikipedia, DBpedia, and the like. Specifically, supervised learning techniques may be applied in cases where there is relevant manually annotated (i.e., labeled) data, in which trained humans have manually determined the level of similarity and/or equivalence of each pair of claims of a given large set of pairs of claims. Alternatively, or in addition, unsupervised learning techniques may be applied to pursue the same goal.

In a step 120, the claims may be clustered into a plurality of clusters based on the identified similarity relations. Each cluster may include semantically equivalent claims, and each pair of semantically equivalent claims may reside in the same cluster. Thus, each cluster may represent a semantically different claim of the set of claims.

Automatic clustering techniques like information-based clustering, spectral clustering, distributional clustering etc., and/or supervised learning techniques may be applied in order to cluster the claims.

In an optional step 125, the arguments may be clustered into a plurality of argument clusters corresponding to the claim clusters. This may be performed by clustering the arguments which include the claims in a claim cluster into an argument cluster, which corresponds to the claim cluster. Accordingly, the argument clusters may represent semantically different arguments of the set of arguments. Each of the emerging argument clusters may subsequently include a set of semantically equivalent arguments, and two semantically equivalent arguments will be assigned to the same cluster. In such a scenario the resulting argument clusters may allow the generation of a non-redundant arguments list as will be further detailed herein below.

In an optional step 130, in each cluster (i.e., cluster of claims or its corresponding cluster of arguments), semantic similarity relations may be identified between evidence associated with the claims within the cluster. This may be performed by applying the same techniques used for identifying semantic similarity relations between the claims with the required modifications. Alternatively or additionally, it may be performed by exploiting properties identifying evidence, like the evidence source, the evidence date, and so forth.

In an optional step 140, the evidence may be clustered based on the relations identified in step 130 above, such that each cluster of evidence (i.e., an evidence cluster) will subsequently include semantically equivalent evidence, and each pair of semantically equivalent evidence will reside in the same cluster of evidence. Therefore, each of the evidence clusters may represent semantically different evidence supporting one of the semantically different claims. This may be performed by applying the same techniques used for clustering the claims and/or arguments with the required modifications. Thus, for each argument in the non-redundant argument list (generated according to step 150 below), the resulting evidence clusters may allow generating a non-redundant list of evidence supporting the claim of the argument, where each piece of evidence in the list represents an evidence cluster.

In a step 150, a non-redundant claims list may be generated. Each cluster of claims may be represented by a claim in the list. In each cluster of claims, a claim may be selected to represent the cluster in the list. In some embodiments, a non-redundant argument list may be generated. Each cluster of arguments may be represented by an argument in the list. In each cluster of arguments, an argument may be selected to represent the cluster in the list. Alternatively, in each cluster of claims, a claim may be selected to represent the cluster. The selection of the arguments which represent the corresponding argument clusters may be such that each selected argument includes a claim which represents the corresponding claim cluster. The representing argument and/or claim may be selected based on a quality score, if such is assigned to the argument/claim, or based on the centroid of the cluster. Optionally, each of the arguments in the list may include a list of non-redundant evidence supporting the claim of the argument. The evidence lists may be generated according to optional steps 130 and 140 above.

The generated list of non-redundant claims and/or arguments may be outputted such that it may be used by a human user or by a machine, including other software components. The output for a human user may be, for example, by displaying the list on a display or by printing it. In some embodiments, a verbal output may be generated (i.e., by uttering the claims and/or arguments list) by using known in the art text to speech techniques.

In general, the actual implementation of each step may vary, depending on the details and statistical characteristics of the list of examined claims and/or arguments. For example, in order to determine the similarity between each pair of claims, the content of each claim may be used in a simple bag-of-words representation. Alternatively or additionally, more complex semantic and linguistic patterns occurring within each claim may be used for this purpose. This may be accompanied by a pairwise-clustering technique like information-based clustering, to cluster the claims into semantically equivalent claims. A similar method may be used to cluster the evidence associated with all claims that were assigned to the same cluster of claims.

Figure 2:
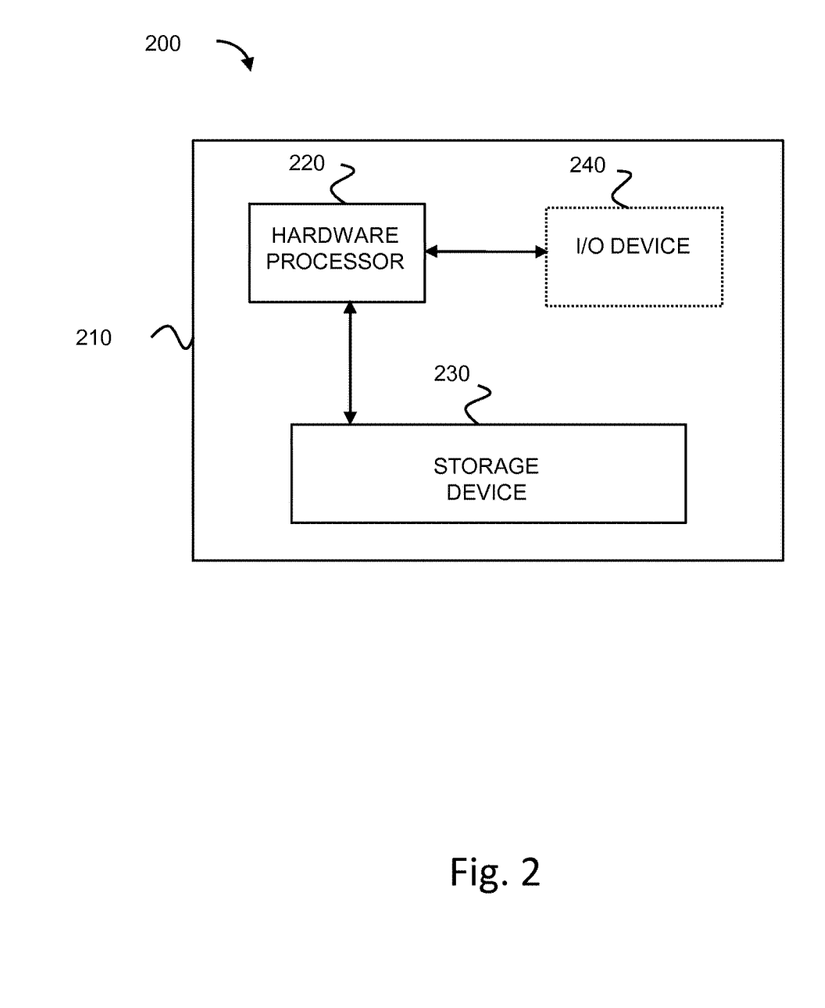
FIG. 2 shows an exemplary system according to an embodiment.

Reference is now made to FIG. 2, which shows an exemplary system 200 according to an embodiment. System 200 may include a computing device 210. Computing device 210 may include a hardware processor 220, a storage device 230 and an optional input/output ("I/O") device 240. Hardware processor 220 may include one or more hardware processors, storage device 230 may include one or more storage devices and I/O device 240 may include one or more I/O devices. Hardware processor 220 may be configured to execute the method of FIG. 1. I/O device 240 may be configured to allow a user to interact with system 200. For example, I/O device 240 may include a display, a loudspeaker and/or a printer which may for example output a list of non-redundant claims and/or arguments for a user according to the method of FIG. 1. Dedicated software, implementing the method of FIG. 1 may be stored on storage device 230 and executed by hardware processor 220.

In some embodiments, computing device 210 may include an I/O device 240 such as a terminal, a display, a keyboard, a mouse, a touch screen, a recorder, a loudspeaker, a printer, an input device and/or the like to interact with system 200, to invoke system 200 and to receive results. It will however be appreciated that system 200 may operate without human operation and without I/O device 240.

In some exemplary embodiments of the disclosed subject matter, storage device 230 may include or be loaded with a user interface. The user interface may be utilized to receive input, such as a TUC and a set of claims and/or arguments and/or provide output, such as a list of non-redundant claims and/or arguments, to and from system 200, including receiving specific user commands or parameters related to system 200, providing output, or the like.

Exemplary Implementation and Experimental Results

An exemplary implementation of the disclosed technique is described herein below. The implementation is composed of several modules. The first module determines if arguments in a given pair of arguments are semantically equivalent. For this purpose, two arguments are considered as equivalent if the claims of the arguments are semantically equivalent. The module is designed as a supervised machine learning algorithm.

In a first step, large labeled dataset was collected from human annotators. Each annotator was presented with a pair of claims and was asked to label whether these claims are semantically the same or not. The labels were provided by nine internal labelers and majority consensus was used to aggregate the labels. Several categories were used in order to make the task less subjective: equivalent, A subsumes B, B subsumes A, partial overlap and not equivalent (where A and B represent the two claims). Labeled data for 30 topics (i.e., TUCs) was collected that resulted in 26,277 pairs of which 584 were semantically equivalent.

Several features were constructed, which were designed to identify whether two claims are equivalent or not. The following is the list of specific features which were used in the implementation:

Bilingual Evaluation Understudy (BLEU): calculates the geometric mean of the n-gram overlap between two claims;
BLEU (synonym): calculates BLEU by treating synonyms as equivalent words;
NIST (which stems from: National Institute of Standards and Technology): calculates the arithmetic mean of the n-gram overlap between two sentences (e.g., claims), where each matching n-gram is weighted based on its rarity;
Translation Error Rate (TER): calculates the number of edits needed in order to move from one sentence to another, where differences in the word order are discounted;
Position independent Error Rate (PER): calculates the overlap between the two sentences by treating each sentence as a bag of words;
Part-of-Speech (POS) based Position-independent word Error Rate (PER): calculates the PER for each POS category;
TreeKernel: calculates the distance between the parse trees of the two sentences;
WordNet based similarity: uses different WordNet based similarity measures to calculate the similarity between the two sentences.

Based on the set of features and the labeled data, a binary classifier, specifically, a Logistic Regression (LR) classifier, was trained. The binary classifier may assign a suitable weight to each of the features and may output a probability that the two claims are equivalent.

Figure 3A:
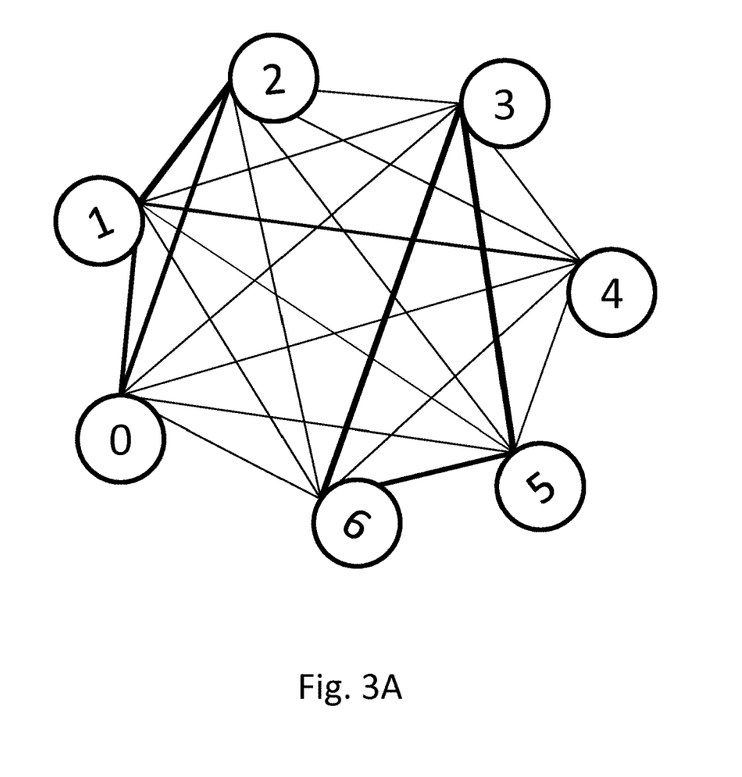
FIG. 3A shows an exemplary control flow graph representing arguments and the probability of equivalence between the arguments.

The second module clusters a given list of arguments into sets of semantically equivalent arguments. A control flow graph including nodes and edges was constructed, where the nodes represent the arguments and the edges (i.e., the segments connecting the nodes) are weights representing the probability that the arguments are equivalent. This probability was computed by the previous (first) module. Reference is now made to FIG. 3A, which shows an exemplary control flow graph representing arguments (indicated by a serial number) and the probability of equivalence between the arguments. The thickness of each edge represents the relative magnitude of the probability that the two nodes connected by the edge are equivalent.

Figure 3B:
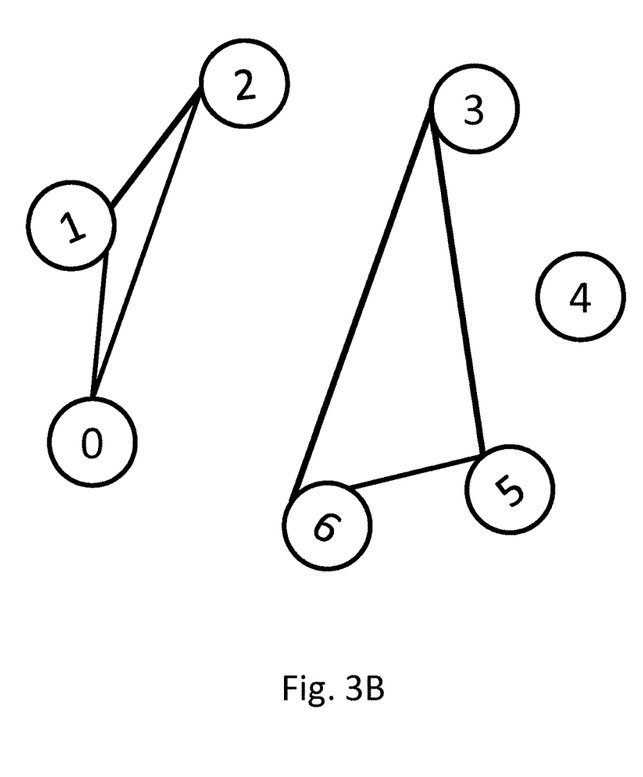
FIG. 3B shows the control flow graph of FIG. 2A sparsified.

The control flow graph may be then sparsified by deleting all edges with edge weights below a predefined threshold (e.g., 0.25). Reference is now made to FIG. 3B, which shows the control flow graph of FIG. 3A sparsified. A connected components algorithm, such as breadth-first search or depth-first search, may be then applied to the control flow graph to receive clusters of arguments.

Such a control flow graph may be used, mutatis mutandis, to cluster a given list of claims into sets of semantically equivalent claims. Accordingly, the nodes may represent the claims and the edges may be weights representing the probability that the claims are equivalent.

The semantic equivalence module was evaluated on claims from nine different topics. The following table lists the number of claims in each topic and also the extracted claim pairs. A total of 7,118 pairs of claims were received of which 118 pairs were labeled as semantically equivalent, as shown in the table below.

| Topic | Confirmed Claims | Extracted Claim Pairs |
|---|---|---|
| 1 | 73 | 1316 |
| 21 | 65 | 1206 |
| 221 | 60 | 951 |
| 61 | 25 | 150 |
| 101 | 72 | 1549 |
| 381 | 61 | 972 |
| 121 | 31 | 255 |
| 81 | 34 | 393 |
| 323 | 37 | 326 |
| Total | 458 | 7118 |
| Equivalent | | 118 |

The performance of the LR classifier was evaluated using two metrics: Average Precision (AP) (or the Area under the Precision-Recall (PR) Curve) and Area under the Receiver Operating Characteristic (ROC) Curve (AUC). The evaluation was done under a Leave-One-Motion-Out (LOMO) mode where for each fold one topic was used for testing the model and the remaining topics were used for training the classifier. The following table shows the AP and AUC for each fold:

| Motion | AP | AUC |
|---|---|---|
| 1 | 0.43 | 0.86 |
| 21 | 0.46 | 0.89 |
| 61 | 0.48 | 0.9 |
| 81 | 0.2 | 0.94 |
| 101 | 0.55 | 0.96 |
| 121 | 0.37 | 0.88 |
| 221 | 0.26 | 0.91 |
| 323 | 0.79 | 0.98 |
| 381 | 0.27 | 1 |

As one may see, the obtained values of the AUC and the AP are high and therefore may be very useful in practice.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computerized text analytics method comprising using at least one hardware processor for:
   receiving a topic under consideration (TUC) and a set of arguments, each including a respective claim referring to the TUC and evidence supporting the claim, wherein each of the claims is a textual statement that directly supports or contests the TUC;
   calculating for each pair of claims in the set of claims, values of a plurality of features selected from a group consisting of:
      a geometric mean of an n-gram overlap between the pair of claims,
      a geometric mean of an n-gram overlap between the pair of claims, in which synonyms are considered as equivalent,
      an arithmetic mean of the n-gram overlap between the pair of claims,
      a number of edits needed in order to move from one of the claims of the pair to the other claim of the pair, where differences in the word order are discounted,
      an overlap between the claims of the pair, when each claim is considered as a bag of words,
      a part of speech word error rate,
      a distance between parse trees of the claims of the pair, and
      a WordNet based similarity measure of the claims of the pair;
   applying a trained binary classifier to the calculated values of the plurality of features for each pair of claims, so as to provide for each pair of claims of the set of claims, a probability that the claims in the pair convey a same idea;
   clustering the claims into a plurality of claim clusters based on the probabilities provided by the binary classifier for the pairs of claims in the set of claims, wherein said claim clusters represent semantically-different claims of the set of claims;
   clustering the arguments into a plurality of argument clusters corresponding to the claim clusters, wherein said argument clusters represent semantically different arguments of the set of arguments;
   clustering the evidence included in the arguments of each of the plurality of argument clusters, into evidence sub-clusters;
   generating a list of non-redundant claims comprising a representative claim for each of the claim clusters;
   generating a non-redundant list of evidence, wherein each piece of evidence in the list of evidence represents an evidence sub-cluster; and
   outputting the generated lists to a human user.

2. The method of claim 1, further comprising generating a list of non-redundant arguments comprising said semantically different arguments.

3. The method of claim 2, wherein said clustering of the arguments comprises:
   constructing a control flow graph comprising nodes and edges, wherein the nodes represent said set of arguments and the edges are weights representing the probability that said arguments are equivalent, sparsifying said control flow graph by deleting edges of said edges having weights below a predefined threshold, and applying a connected components algorithm to said control flow graph to receive said clusters of said arguments.

4. The method of claim 1, wherein said binary classifier is a logistic regression classifier.

5. The method of claim 1, wherein said clustering of the claims comprises:

constructing a control flow graph comprising nodes and edges, wherein the nodes represent said set of claims and the edges are weights representing the probability that said claims are equivalent, sparsifying said control flow graph by deleting edges of said edges having weights below a predefined threshold, and applying a connected components algorithm to said control flow graph to receive said clusters of said claims.

6. The method of claim 1, wherein the binary classifier is trained by:

receiving a large dataset of claims;

receiving indications provided by human annotators of similarity between each pair of the claims, in the received dataset of claims;

calculating for each of the pair of the claims, values of the plurality of features; and training the binary classifier based on the received dataset of claims, the received similarity indications and the calculated values of the plurality of features.

7. The method of claim 1, wherein the probability provided by the binary classifier comprises a binary similarity score.

8. The method of claim 1, wherein generating the list of non-redundant claims comprises selecting for each cluster a claim which is a centroid of the cluster.

9. The method of claim 1, wherein generating the list of non-redundant claims comprises selecting for each cluster a claim based on quality scores of the claims in the cluster.

10. The method of claim 1, wherein clustering the evidence included in the arguments of each of the plurality of argument clusters, into evidence sub-clusters comprises clustering based on semantic similarity relations.

11. The method of claim 1, wherein clustering the evidence included in the arguments of each of the plurality of argument clusters, into evidence sub-clusters comprises clustering based on the evidence source or the evidence date.

12. A computer program product comprising a non-transitory computer-readable storage medium having program code embodied therewith, the program code executable by at least one hardware processor to:

receive a topic under consideration (TUC) and a set of arguments, each including a respective claim referring to the TUC and evidence supporting the claim, wherein each of the claims is a textual statement that directly supports or contests the TUC;

calculate for each pair of claims in the set of claims, values of a plurality of features selected from a group consisting of:

a geometric mean of an n-gram overlap between the pair of claims, a geometric mean of an n-gram overlap between the pair of claims, in which synonyms are considered as equivalent, an arithmetic mean of the n-gram overlap between the pair of claims, a number of edits needed in order to move from one of the claims of the pair to the other claim of the pair, where differences in the word order are discounted, an overlap between the claims of the pair, when each claim is considered as a bag of words, a part of speech word error rate, a distance between parse trees of the claims of the pair, and a WordNet based similarity measure of the claims of the pair;

apply a trained binary classifier to the calculated values of the plurality of features for each pair of claims, so as to provide for each pair of claims of the set of claims, a probability that the claims in the pair convey a same idea;

cluster the claims into a plurality of claim clusters based on the probabilities provided by the binary classifier for the pairs of claims in the set of claims, wherein said claim clusters represent semantically different claims of the set of claims;

cluster the arguments into a plurality of argument clusters corresponding to the claim clusters;

cluster the evidence included in the arguments of each of the plurality of argument clusters, into evidence sub-clusters;

generate a list of non-redundant claims comprising a representative claim for each of the claim clusters;

generate a non-redundant list of evidence, wherein each piece of evidence in the list of evidence represents an evidence sub-cluster; and output the generated lists to a human user.

13. The computer program product of claim 12, wherein said program code is further executable by said at least one hardware processor to:

generate a list of non-redundant arguments comprising said semantically different arguments.

14. The computer program product of claim 13, wherein said clustering of the arguments comprises:

constructing a control flow graph comprising nodes and edges, wherein the nodes represent said set of arguments and the edges are weights representing the probability that said arguments are equivalent;

sparsifying said control flow graph by deleting edges of said edges having weights below a predefined threshold; and applying a connected components algorithm to said control flow graph to receive said clusters of said arguments.

15. The computer program product of claim 12, wherein said clustering of the claims comprises:

constructing a control flow graph comprising nodes and edges, wherein the nodes represent said set of claims and the edges are weights representing the probability that said claims are equivalent;

sparsifying said control flow graph by deleting edges of said edges having weights below a predefined threshold; and applying a connected components algorithm to said control flow graph to receive said clusters of said claims.

16. A system comprising:

(i) a non-transitory storage device having stored thereon instructions for:

receiving a topic under consideration (TUC) and a set of arguments, each including a respective claim referring to the TUC and evidence supporting the claim, wherein each of the claims is a textual statement that directly supports or contests the TUC, calculating for each pair of claims in the set of claims, values of a plurality of features selected from a group consisting of:
- a geometric mean of an n-gram overlap between the pair of claims,
- a geometric mean of an n-gram overlap between the pair of claims, in which synonyms are considered as equivalent,
- an arithmetic mean of the n-gram overlap between the pair of claims,
- a number of edits needed in order to move from one of the claims of the pair to the other claim of the pair, where differences in the word order are discounted,
- an overlap between the claims of the pair, when each claim is considered as a bag of words,
- a part of speech word error rate,
- a distance between parse trees of the claims of the pair, and
- a WordNet based similarity measure of the claims of the pair;

applying a trained binary classifier to the calculated values of the plurality of features for each pair of claims, so as to provide for each pair of claims of the set of claims, a probability that the claims in the pair convey a same idea, clustering the claims into a plurality of claim clusters based on the probabilities provided by the binary classifier for the pairs of claims in the set of claims, wherein said claim clusters represent semantically different claims of the set of claims, clustering the arguments into a plurality of argument clusters corresponding to the claim clusters;

clustering the evidence included in the arguments of each of the plurality of argument clusters, into evidence sub-clusters;

generating a list of non-redundant claims comprising a representative claim for each of the claim clusters;

generating a non-redundant list of evidence, wherein each piece of evidence in the list of evidence represents an evidence sub-cluster; and outputting the generated lists to a human user;

(ii) at least one hardware processor configured to execute said instructions.

17. The system of claim 16, wherein said storage device have further stored thereon instructions for:

generating a list of non-redundant arguments comprising said semantically different arguments.

* * * * *